US 6,604,633 B2

(12) United States Patent
Otsuka

(10) Patent No.: US 6,604,633 B2
(45) Date of Patent: Aug. 12, 2003

(54) COMBINATIONS OF STIMULABLE PHOSPHOR SHEETS AND CASSETTES

(75) Inventor: Yuzuru Otsuka, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 75 days.

(21) Appl. No.: 09/964,685

(22) Filed: Sep. 28, 2001

(65) Prior Publication Data

US 2002/0036756 A1 Mar. 28, 2002

(30) Foreign Application Priority Data

Sep. 28, 2000 (JP) ........................................ 2000-295418

(51) Int. Cl.⁷ .............................................. B65D 85/48
(52) U.S. Cl. ........................ 206/455; 378/182; 378/188
(58) Field of Search ............................... 206/455, 459.5; 378/182, 188

(56) References Cited

U.S. PATENT DOCUMENTS

| 3,688,734 A | * | 9/1972 | Davis et al. ........... 116/114 AH |
| 4,258,264 A | | 3/1981 | Kotera et al. |
| 4,346,295 A | | 8/1982 | Tanaka et al. |
| 4,394,772 A | * | 7/1983 | Okamoto et al. ............ 378/182 |
| 4,485,302 A | | 11/1984 | Tanaka et al. |
| 4,681,227 A | * | 7/1987 | Tamura et al. .............. 206/455 |
| 5,090,567 A | * | 2/1992 | Boutet ......................... 206/455 |
| 5,124,550 A | * | 6/1992 | Boutet et al. ............. 250/327.2 |
| 2002/0044630 A1 | * | 4/2002 | Minnigh et al. ............ 378/174 |

FOREIGN PATENT DOCUMENTS

| JP | 55-12429 | 2/1980 |
| JP | 55-87970 | 7/1980 |
| JP | 56-11395 | 2/1981 |
| JP | 56-11397 | 2/1981 |

\* cited by examiner

*Primary Examiner*—David T. Fidei
(74) *Attorney, Agent, or Firm*—Sughrue Mion, PLLC

(57) ABSTRACT

In combinations of stimulable phosphor sheets and cassettes, at least a stimulable phosphor sheet for single-side reading is prevented from being stored in a cassette for double-side reading. A shape of the stimulable phosphor sheet for single-side reading is different from a shape of a stimulable phosphor sheet for double-side reading. A shape of a container area of the cassette for double-side reading does not allow the sheet for single-side reading to be contained therein, due to the difference in the shapes of the sheets.

15 Claims, 13 Drawing Sheets

F I G . 3
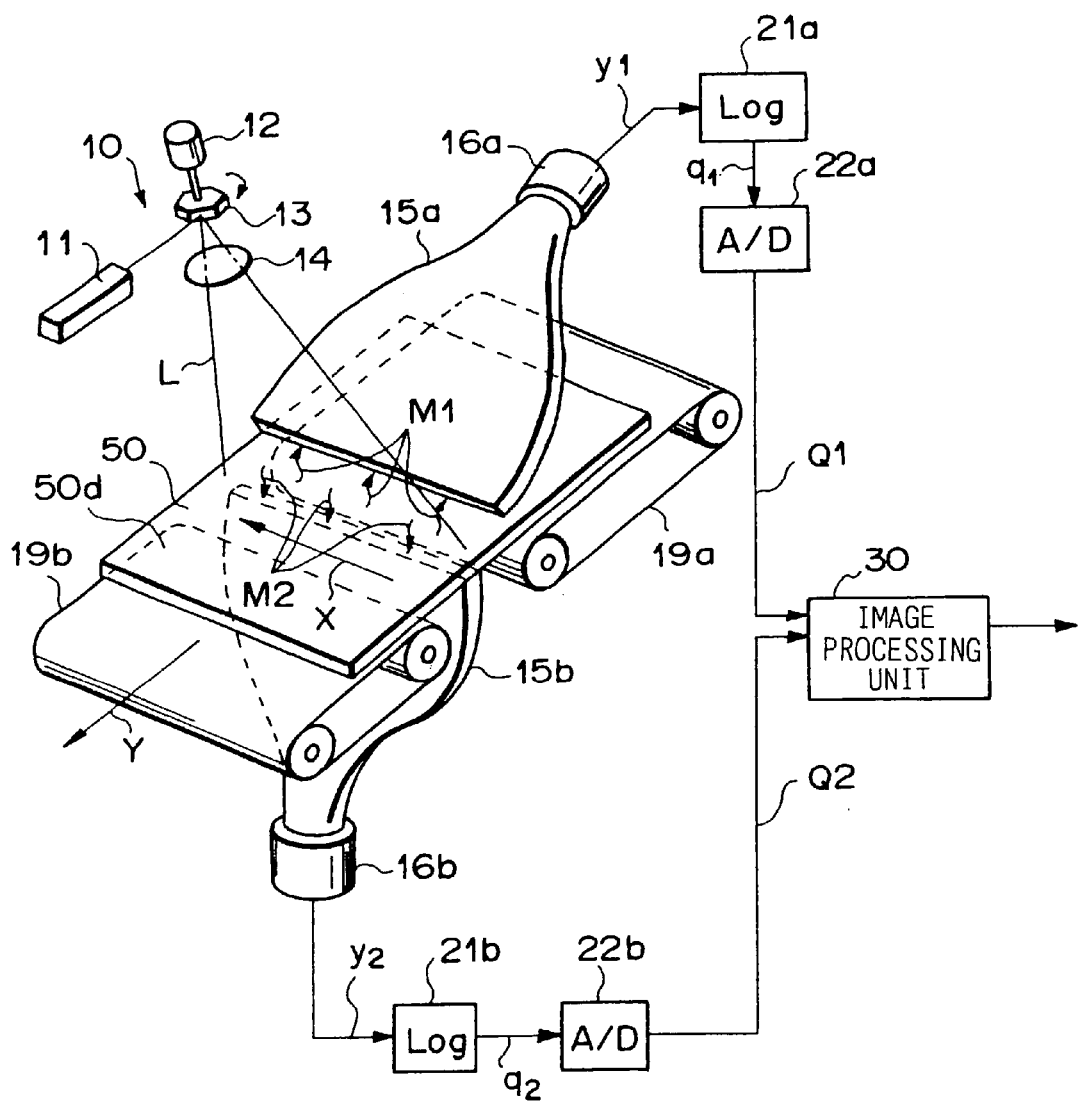

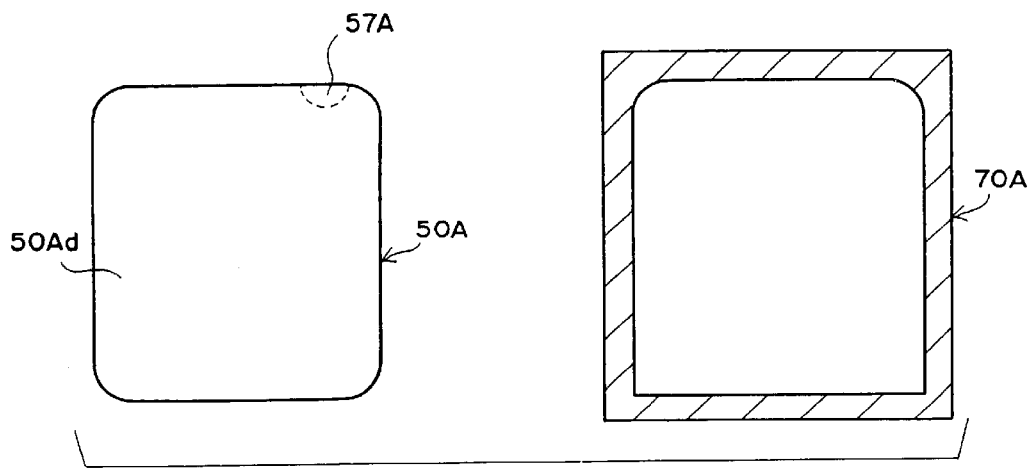
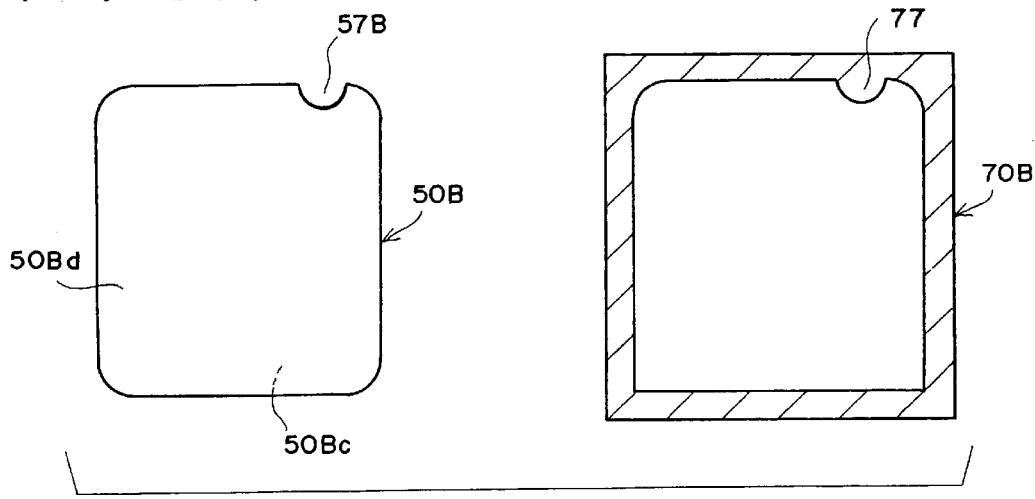

COMBINATIONS OF STIMULABLE PHOSPHOR SHEETS AND CASSETTES

BACKGROUND OF THE INVENTION

1. Field of the Invention

The present invention relates to a stimulable phosphor sheet having a stimulable phosphor layer and a cassette storing the stimulable phosphor sheet.

2. Description of the Related Art

There has been known a radiation image recording reproducing system using stimulable phosphor which stores a portion of energy of radiation (such as X-rays, a rays, rays, rays, electron rays, and ultraviolet rays) irradiated thereon and emits light in accordance with the energy stored therein upon exposure to excitation light such as visible light (Japanese Unexamined Patent Publication Nos. 55(1980)-12429, 56(1981)-11395, and 56(1981)-11397, for example). In such a system, radiation image information of a subject such as a human body is recorded on a stimulable phosphor sheet and the sheet is scanned with excitation light such as a laser beam to have the sheet emit light. The light is photoelectrically read to obtain an image signal, and a radiation image of the subject is output as a visible image on a recording medium such as a photosensitive material or on a display apparatus such as a CRT, based on the image signal.

As methods of photoelectrically reading the light, single-side reading and double-side reading are known. In single-side reading, an image signal is read only from one side of a stimulable phosphor sheet. In double-side reading, image signals are read respectively from each side of a stimulable phosphor sheet having a layer of stimulable phosphor. The layer is formed on a front side of a transparent base-material sheet comprising a transparent film or the like of 100~500 $\mu$m thickness, for example. Radiation is irradiated from the side of the stimulable phosphor layer on the stimulable phosphor sheet to record radiation image information. The stimulable phosphor sheet is then scanned with excitation light from the side of the stimulable phosphor layer, and light emitted to both a front side (the side of the stimulable phosphor layer) and to a backside (the side of the transparent base material) of the stimulable phosphor sheet is read respectively by photoelectric reading means on the front side and the backside (see Japanese Unexamined Patent Publication No. 55(1980)-87970, for example). In double-side reading, by carrying out an addition process on signals obtained from both sides at pixels corresponding to each other, light collection efficiency improves and noise components are averaged. Therefore, an S/N ratio of a radiation image obtained in this manner can be improved.

In the radiation image recording reproducing system described above, photographing is carried out by using a stimulable phosphor sheet stored in a cassette having a flat shape. In the case where a photographed image is read, the cassette is set on an automatic reading apparatus. The reading apparatus automatically opens the cassette and takes out the stimulable phosphor sheet to carry out reading.

Different cassettes are used for single-side reading and for double-side reading. Therefore, the reading apparatus judges whether a stimulable phosphor sheet stored in a cassette is for single-side reading or for double-side reading, by reading a bar code on the cassette or on the stimulable phosphor sheet. In this manner, appropriate reading is carried out.

For example, if a cassette for double-side reading is set on an automatic reading apparatus, the reading apparatus reads a bar code of the cassette and recognizes that the cassette is for double-side reading. Assuming that a sheet in the cassette is for double-side reading, the reading apparatus then carries out addition processing on image signals read from both sides of the sheet by using a predetermined addition ratio.

However, a conventional cassette for single-side reading and a conventional cassette for double-side reading are substantially identical in appearance, and a stimulable phosphor sheet for single-side reading has substantially the same shape as a stimulable phosphor sheet for double-side reading. Therefore, a stimulable phosphor sheet for single-side reading can often be mistakenly stored in a cassette for double-side reading while a stimulable phosphor sheet for double-side reading can be stored in a cassette for single-side reading.

Furthermore, since the automatic reading apparatus described above is set to carry out the reading process on the premise that a combination of a cassette and a stimulable phosphor sheet is right, the reading apparatus carries out double-side reading by recognizing a bar code on a double-side reading cassette, even if a stimulable phosphor sheet for single-side reading is stored in the cassette by mistake. As a result, the reading apparatus outputs an image signal from the sheet after carrying out addition processing on image signals read from both sides. Since light is not detected from the backside of the stimulable phosphor sheet for single-side reading, no backside image signal is practically added. Therefore, an image represented by the image signal obtained as a result becomes extremely unclear.

Moreover, in the case of a stimulable phosphor sheet for double-side reading having a stimulable phosphor layer on a front side of a transparent base material, the front side is not easily distinguished from a backside thereof, since the base material is transparent. For example, when the sheet is stored in a cassette, the sheet can be mistakenly stored face down in the cassette, although it should be stored in such a manner that the front side of the sheet faces a front side of the cassette (the side which faces a radiation source at the time of photographing).

The reading apparatus scans the stimulable phosphor sheet from the front side, that is, from the side of the stimulable phosphor layer, assuming that the sheet for double-side reading is appropriately stored in the cassette. If the sheet for double-side reading is set face down in the cassette, the reading apparatus actually carries out the scan from the side of the transparent base material, which causes appropriate reading to become difficult due to the scanning via the transparent base material. Consequently, sharpness of an image obtained thereby degrades a great deal.

SUMMARY OF THE INVENTION

The present invention has been conceived based on consideration of the above problems. An object of the present invention is therefore to provide combinations of stimulable phosphor sheets and cassettes therefor, for avoiding a problem of erroneous combination of a stimulable phosphor sheet for double-side reading and a cassette for single-side reading and vice versa.

Another object of the present invention is to provide a combination of a stimulable phosphor sheet for double-side reading and a cassette therefor, for avoiding a problem of face down setting of the double-side reading stimulable phosphor sheet in the cassette.

Combinations of stimulable phosphor sheets and cassettes of the present invention are a combination of a double-side reading stimulable phosphor sheet enabling reading from both sides of the sheet and a cassette for double-side reading having a container area for containing said double-side reading stimulable phosphor sheet, and a combination of a single-side reading stimulable phosphor sheet enabling reading only from one side of the sheet and a cassette for single-side reading having a container area for containing the single-side reading stimulable phosphor sheet. The combinations of the present invention are characterized in that the double-side reading stimulable phosphor sheet has a shape different from the shape of the single-side reading stimulable phosphor sheet and a shape of the container area of the cassette for double-side reading prevents the single-side reading stimulable phosphor sheet from being contained in the cassette due to a difference in the shapes of the sheets.

As the shapes of the sheets and the container area of the cassette for double-side reading, the single-side reading sheet has an additional part not existing in a corresponding position in the double-side reading stimulable phosphor sheet, and the shape of the container area of the cassette for double-side reading prevents the single-side reading stimulable phosphor sheet from being contained in the cassette due to the additional part of the single-side reading stimulable phosphor sheet, for example.

The "corresponding position in the double-side reading stimulable phosphor sheet" refers to a position in the double-side reading stimulable phosphor sheet in which the additional part exists in the single-side reading stimulable phosphor sheet.

Other combinations of stimulable phosphor sheets and cassettes of the present invention are a combination of a double-side reading stimulable phosphor sheet enabling reading from both sides of the sheet and a cassette for double-side reading having a container area for containing the double-side reading stimulable phosphor sheet and a combination of a single-side reading stimulable phosphor sheet enabling reading only from one side of the sheet and a cassette for single-side reading having a container area for containing the single-side reading stimulable phosphor sheet. The combinations of the present invention are characterized in that the double-side reading stimulable phosphor sheet has a shape different from a shape of the single-side reading stimulable phosphor sheet and a shape of the container area of the cassette for double-side reading prevents the single-side reading stimulable phosphor sheet from being contained in the cassette due to a difference in the shapes of the sheets while a shape of the container area of the cassette for single-side reading prevents the double-side reading stimulable phosphor sheet from being contained in the cassette due to the difference in the shapes of the sheets.

As the shapes of the single-side reading stimulable phosphor sheet and the container area of the cassette for double-side reading, the single-side reading sheet is formed to have an additional part not existing in a corresponding position in the double-side reading stimulable phosphor sheet, and the shape of the container area of the cassette for double-side reading prevents the single-side reading stimulable phosphor sheet from being contained in the cassette due to the additional part of the single-side reading stimulable phosphor sheet, for example. Meanwhile, as the shapes of the double-side reading stimulable phosphor sheet and the container of the cassette for single-side reading, the double-side reading sheet has an additional part not existing in a corresponding position in the single-side reading stimulable phosphor sheet, and the shape of the container area of the cassette for single-side reading prevents the double-side reading stimulable phosphor sheet from being contained in the cassette due to the additional part of the double-side reading stimulable phosphor sheet, for example.

As the additional parts, a thick additional part having more thickness or an additional plane part having a wider area may be used, for example.

In the combinations of the stimulable phosphor sheets and the cassettes, it is preferable for the double-side reading stimulable phosphor sheet to have different shapes when viewed from a front side and from a backside thereof while it is preferable for the shape of the container area of the cassette for double-side reading to prevent the double-side reading stimulable phosphor sheet from being contained in the cassette in a face down state, due to a difference in the shapes of the double-side reading stimulable phosphor sheet viewed from the front side and from the backside thereof.

Still other combinations of stimulable phosphor sheets and cassettes of the present invention are a combination of a double-side reading stimulable phosphor sheet enabling reading from both sides of the sheet and a cassette for double-side reading having a container area for containing the double-side reading stimulable phosphor sheet and a combination of a single-side reading stimulable phosphor sheet enabling reading only from one side of the sheet and a cassette for single-side reading having a container area for containing the single-side reading stimulable phosphor sheet. The combinations of the present invention are characterized in that either the double-side reading stimulable phosphor sheet or the single-side reading stimulable phosphor sheet has a colored part and the cassette for the sheet having the colored part has a colored part corresponding to the colored part of the sheet.

Yet other combinations of stimulable phosphor sheets and cassettes of the present invention are a combination of a double-side reading stimulable phosphor sheet enabling reading from both sides of the sheet and a cassette for double-side reading having a container area for containing the double-side reading stimulable phosphor sheet and a combination of a single-side reading stimulable phosphor sheet enabling reading only from one side of the sheet and a cassette for single-side reading having a container area for containing the single-side reading stimulable phosphor sheet. The combinations of the present invention are characterized in that both the double-side reading stimulable phosphor sheet and the single-side reading stimulable phosphor sheet have respective colored parts having different shapes or colors or in different positions and the cassettes to contain the respective sheets have respective colored parts corresponding to the colored parts of the corresponding sheets.

The colored part in the double-side reading stimulable phosphor sheet may be formed only on either a front side or a backside thereof so that the colored part in the cassette for double-side reading is formed on a material facing the side of the double-side reading sheet on which the colored part of the sheet is formed. Furthermore, the colored parts of the double-side reading stimulable phosphor sheet may be formed on both sides of the sheet in different shapes or colors or in different positions so that the colored parts of the cassette for double-side reading are formed on materials facing both the sides of the sheet, corresponding to the colored parts on both the sides of the sheet.

According to the combinations of the stimulable phosphor sheets and the cassettes of the present invention, the stimulable phosphor sheet for double-side reading has a different shape from the stimulable phosphor sheet for single-side reading, and the cassette for double-side reading has the shape disabling the sheet for single-side reading from being contained therein, due to the difference in the shapes of the sheets. Therefore, the cassette for double-side reading cannot contain the sheet for single-side reading, and a problem of erroneous setting of the stimulable phosphor sheet for single-side reading in the cassette for double-side reading can be securely avoided. In this manner, in appropriate reading of the stimulable phosphor sheet for single-side reading in the cassette for double side reading can be prevented from being carried out.

In the combinations of the stimulable phosphor sheets and the cassettes of the present invention, the stimulable phosphor sheet for double-side reading has a shape different from the shape of the stimulable phosphor sheet for single-side reading. In addition, each of the cassettes has the shape that disables the sheet of a different combination from being contained therein. Therefore, the sheet for single-side reading cannot be stored in the cassette for double-side reading, and vice versa. In this manner, erroneous sheet insertion in the cassette of the other combination can be prevented with certainty.

If the stimulable phosphor sheet for double-side reading has different shapes when viewed from the front side and the backside thereof, and if the cassette for double-side reading has the shape disabling the stimulable phosphor sheet for double-side reading from being contained therein in a face down state due to the shape difference, the stimulable phosphor sheet cannot be contained in the cassette face down. Therefore, the sheet is securely prevented from being contained face down in the cassette.

In the combinations of the stimulable phosphor sheets and the cassettes of the present invention, if either the stimulable phosphor sheet for single-side reading or the stimulable phosphor sheet for double-side reading has a colored part and if only the cassette for containing the sheet having the colored part has a colored part corresponding to the colored part of the sheet, the stimulable phosphor sheet having the colored part is set in the cassette having the colored part while the stimulable phosphor sheet not having the colored part is set in the cassette not having the colored part. In this manner, erroneous setting can be avoided.

Furthermore, in the combinations of the stimulable phosphor sheets and the cassettes of the present invention, both the stimulable phosphor sheets for double-side reading and single-side reading have the colored parts of different shapes or colors or in different positions, and the cassettes therefor have the respective colored parts corresponding to the colored parts of the sheets to be contained therein. Therefore, without distinction between the stimulable phosphor sheets, the stimulable phosphor sheets are simply contained in the respective cassettes having the colored parts corresponding to the colored parts thereof. In this manner, erroneous setting can be avoided.

If the colored part of the stimulable phosphor sheet for double-side reading is formed only on either the front side or the backside thereof, and if the colored part of the cassette for double-side reading is formed on the material facing the side of the sheet having the colored part thereon, the colored part of the sheet is simply matched with the colored part of the cassette at the time of setting the sheet in the cassette. In this manner, a problem of setting the sheet face down can be prevented.

Moreover, if the colored parts of the stimulable phosphor sheet for double-side reading are formed on both sides thereof in different shapes or colors or in different positions, and if the colored parts of the cassette for double-side reading are formed on the materials facing the respective sides of the sheet to correspond to the respective colored parts of the sheet, the colored parts of the sheet are simply matched with the colored parts of the cassette at the time of setting the sheet in the cassette. In this manner, the sheet can be prevented from being set face down.

BRIEF DESCRIPTION OF THE DRAWINGS

FIG. 3 is a diagram showing a configuration of a reading apparatus for carrying out double-side reading of the stimulable phosphor sheet;

FIGS. 7A and 7B are diagrams showing another embodiment of combinations of stimulable phosphor sheets and cassettes of the present invention;

DESCRIPTION OF THE PREFERRED EMBODIMENTS

Hereinafter, embodiments of the present invention will be explained with reference to the accompanying drawings.

First, a stimulable phosphor sheet, a cassette for storing the sheet, and double-side reading of the sheet will be explained with reference to FIGS. 1 to 3.

Figure 1:
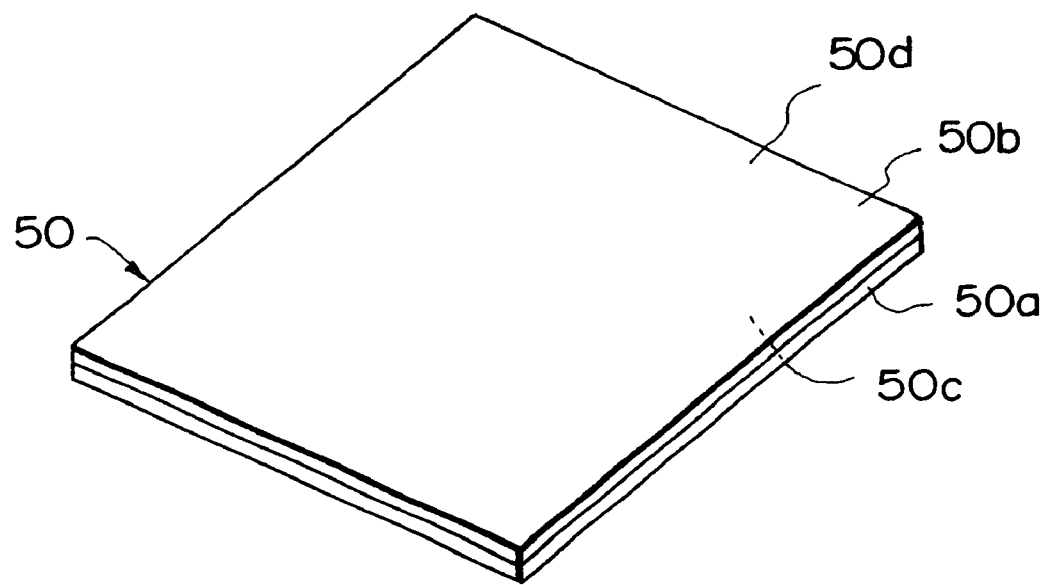
FIG. 1 is a perspective view showing a configuration of a stimulable phosphor sheet of the present invention.

As shown in FIG. 1, a stimulable phosphor sheet 50 of the present invention comprises a base material 50a having a sheet-like shape and a sheet-like stimulable phosphor layer (BaFBrI:Eu) 50b formed on a front side of the base material 50a. Regarding the stimulable phosphor sheet 50, the side on which the base material 50a exists is the backside 50c, while the side on which the stimulable phosphor layer 50b is situated is the front side 50d. The stimulable phosphor sheet 50 is formed to be rectangular (rectangle or square) when viewed from the front side 50d. Furthermore, a transparent protection layer (not shown) having a thickness of 2~50 μm is formed on the front side of the stimulable phosphor layer 50b.

If the stimulable phosphor sheet enables double-side reading, a transparent material allowing transmission of light from the sheet is used as the base material 50a. More specifically, the base material is generally made of a soft transparent plastic film having a thickness of 100~500 μm and flexibility. However, a hard transparent plastic sheet having rigidity may also be used as the base material. If the stimulable phosphor sheet only enables single-side reading, it is not necessary to use a transparent material as the base material 50a.

Figure 2A:
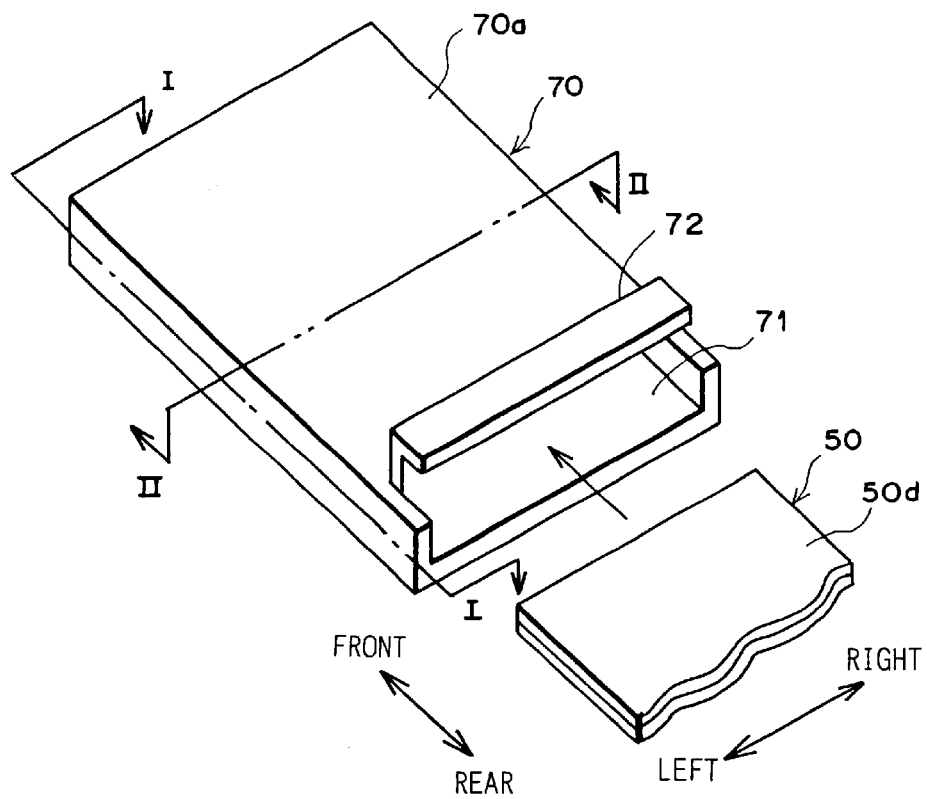
FIGS. 2A and 2B are diagrams showing a configuration of a cassette storing the stimulable phosphor sheet of the present invention.
Figure 2B:
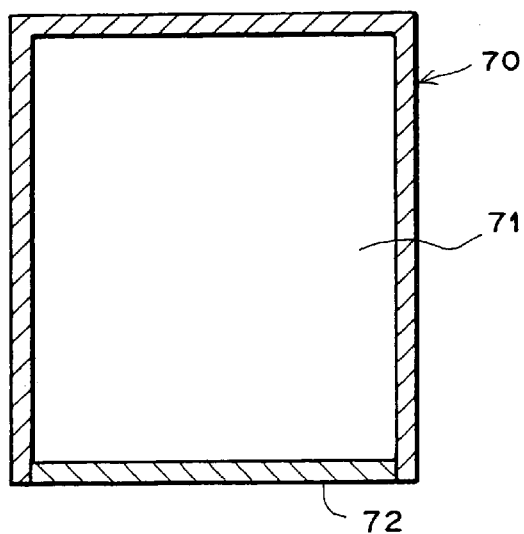

FIG. 2A is a perspective view of a cassette 70 containing the stimulable phosphor sheet 50, and FIG. 2B is a cross-sectional view of the cassette 70 cut by a line I—I in FIG. 2A. As shown in FIGS. 2A and 2B, the cassette 70 comprises a sheet container area 71 and a lid 72 which can be opened and closed at one end thereof. The stimulable phosphor sheet 50 is put in and out in a state where the lid 72 is open, as shown in FIG. 2A. An inside shape of the container area 71 fits a shape of the stimulable phosphor sheet 50, as shown in FIG. 2B.

FIG. 3 is a diagram showing an example of a radiation image reading apparatus for reading radiation image information recorded on the stimulable phosphor sheet 50. The reading apparatus in FIG. 3 can read the radiation image information recorded on the stimulable phosphor layer 50b of the sheet 50 shown in FIG. 1 from both sides of the stimulable phosphor sheet 50.

In the reading apparatus shown in FIG. 3, the stimulable phosphor sheet 50 having the radiation image information is set face up in a predetermined position on an endless belt 19a. The sheet is conveyed (sub-scanned) in a direction shown by an arrow Y by the endless belt 19a and an endless belt 19b both driven by a motor not shown.

Meanwhile, a laser beam L as a excitation light emitted from a light source 11 is reflected and deflected by a polygon mirror 13 rotating at a high speed in a direction shown by an arrow by being driven by a motor 12. The laser beam L is converged on the front side of the stimulable phosphor sheet 50 by a scanning lens 14 while scanning the front side 50d of the sheet 50 in a direction shown by an arrow X at an equal speed. The laser beam L is irradiated on an entire surface of the stimulable phosphor sheet 50 by a main scan with the laser beam L as well as the sub-scan caused by conveyance of the stimulable phosphor sheet 50.

The laser beam L irradiated on the sheet 50 excites the stimulable phosphor layer 50b of the sheet 50, and light M1 is emitted from the front side 50d of the sheet 50 in accordance with the radiation image information recorded thereon. Light M2 is also emitted from the backside 50c of the sheet 50 in accordance with the radiation image information recorded thereon.

The light M1 and M2 emitted from the front side 50d and the backside 50c of the sheet 50 is respectively led to photomultipliers 16a and 16b by light condensing guides 15a and 15b located closely to the front side 50d and the backside 50c of the sheet 50. The light M1 and M2 are then detected photoelectrically by the photomultipliers 16a and 16b. The light condensing guides 15a and 15b are made of a material that allows the light to pass through, such as an acrylic board. Each of the light condensing guides is placed so that a straight end surface thereof from which the light enters becomes parallel to the main scan direction. Another end surface having a circular shape is connected to a light reception plane of the corresponding photomultiplier. The light M1 and M2 respectively entering the light condensing guides 15a and 15b from the straight ends propagate inside the guides while being reflected critically, and emerge from the circular ends to be received by the photomultipliers 16a and 16b. Amounts of the light M1 and M2 representing the radiation image information from both sides of the sheet are respectively converted into analog image signals y1 and y2 by the photomultipliers 16a and 16b.

The analog signals y1 and y2 output respectively from the photomultipliers 16a and 16b are logarithmically amplified by logarithmic amplifiers 21a and 21b, and converted into logarithmic image signals q1 and q2. The logarithmic image signals q1 and q2 are respectively input to A/D conversion circuits 22a and 22b and converted into digital image data Q1 and Q2 at a predetermined sampling period T to be input to an image processing unit 30.

The image processing unit 30 relates the image data Q1 with the image data Q2 at pixels corresponding to each other and carries out weighted addition using a pre-set addition ratio. The image processing unit 30 then carries out various kinds of signal processing such as tone processing and frequency processing on an image signal Q for each pixel, and outputs the processed signal to an external image reproduction apparatus or the like. The addition ratio of the front-side data to the backside data is set appropriately to suppress noise.

In the above explanation, the case of double-side reading has been described. However, the image reading apparatus can be used for carrying out single-side reading of the stimulable phosphor sheet. In this case, light emitted only from the front side 50d of the sheet 50 is read. The reading is carried out with an excitation light as in the above example, while operation of the photomultiplier 16b on the backside is suspended. In this manner, only the signal Q1 from the photomultiplier 15a on the front side is output to an addition unit 23 (not shown in FIG. 3), and the signal Q1 is output as an image signal S1 from the addition unit 23 to an operation unit 80 (also not shown in FIG. 3).

The cassette shown in FIG. 2 is attached to the image reading apparatus, and the reading apparatus carries out the reading processing by reading a bar code on the cassette. Therefore, when the cassette attached to the apparatus is for double-side reading, double-side reading is carried out on the sheet stored in the cassette, followed by addition processing on the image signals from the front side and from the backside. When the cassette is for single-side reading, single-side reading is carried out on the sheet stored therein.

Embodiments of combinations of stimulable phosphor sheets and cassettes of the present invention will be explained with reference to FIGS. 4 to 12. In FIGS. 4 to 12, A shows a combination of a stimulable phosphor sheet 50A and a cassette 70A for single-side reading, while B shows a combination of a stimulable phosphor sheet 50B and a cassette 70B for double-side reading.

First, embodiments of the stimulable phosphor sheet 50A for single-side reading which cannot be contained in the cassette 70B for double-side reading will be explained with reference to FIGS. 4 to 7.

Figure 4A:
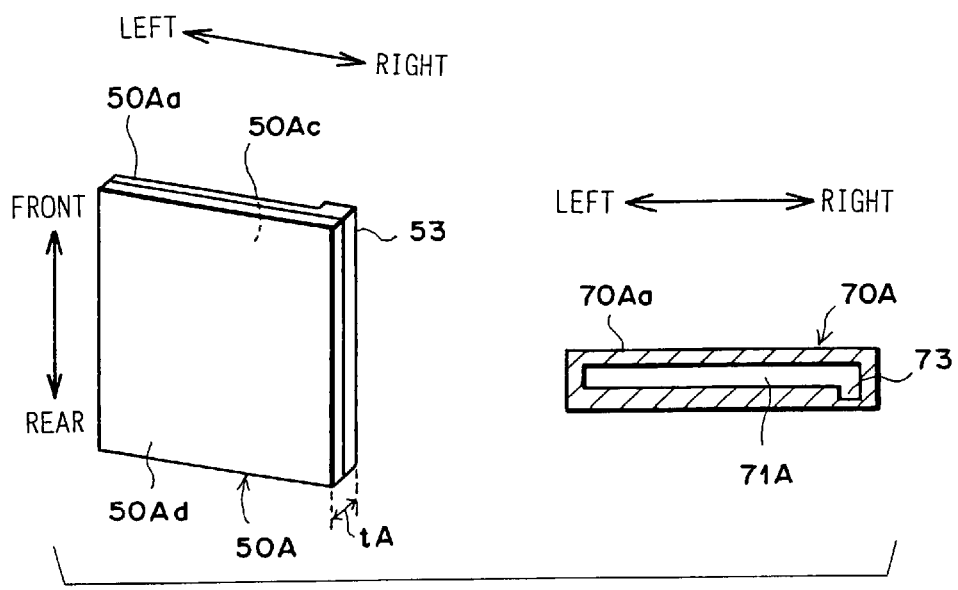
FIGS. 4A and 4B are diagrams showing an embodiment of combinations of stimulable phosphor sheets and cassettes of the present invention.
Figure 4B:
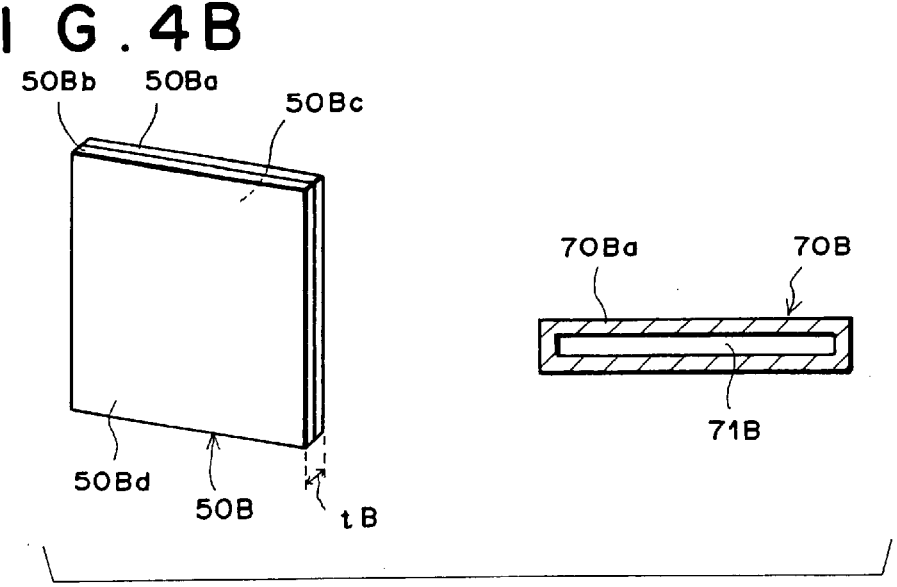

FIG. 4 shows an embodiment of a stimulable phosphor sheet 50A for single-side reading having a thick additional part not existing in a stimulable phosphor sheet 50B for double-side reading in a corresponding position. In combinations shown in FIG. 4, the sheets are shown by a perspective view and the cassettes are shown by a cross-sectional view cut by a line corresponding to a line II—II shown in FIG. 2A. The sheet 50A has a projecting additional part 53, which does not exist in the sheet 50B, over an entire length of a right-side edge on a backside 50Ac of the sheet. In other words, the sheet 50A for single-side reading is made to be thicker ($t_A > t_B$) than the sheet 50B for double-side reading in the right-side edge, due to the additional part 53. In this embodiment, the additional part 53 is formed integrally with a base material 50a as shown in FIG. 4, which may be made separately from the material and attached on the backside 50c of the material.

The cassette 70A containing the sheet 50A for single-side reading has a groove 73 fitting the thick additional part 53 of the sheet 50A on a right-side edge of a container area 71A at a bottom thereof when viewed from a front side 70Aa of the cassette. Meanwhile, a cassette 70B for double-side reading to store a sheet 50B for double-side reading does not have such a groove in a container area 71B thereof, and has a uniform thickness appropriate to the thickness $t_B$ of the sheet 70B.

Therefore, the sheet 50A for single-side reading cannot be stored in the cassette 70B for double-side reading, due to the thick additional part 53 thereof.

In this embodiment, the projecting additional part is formed at one edge of the stimulable phosphor sheet for single-side reading. However, various shapes can be used as the additional part in various positions. Furthermore, if the sheet for single-side reading has a uniform thickness while the sheet for double-side reading has a groove where thickness is smaller than the sheet for single-side reading, a portion of the sheet for single-side reading corresponding to the groove can be used as the thick additional part. In this case, the cassette for double-side reading has a projection corresponding to the groove of the sheet for double-side reading. The cassette for double-side reading cannot contain the sheet for single-side reading, due to the projection. Moreover, if the sheet for single-side reading has a uniform thickness larger than the thickness of the sheet for double-side reading and if the cassettes therefor respectively have the thickness corresponding to the thickness of the sheets to be contained therein, the sheet for single-side reading cannot be stored in the cassette for double-side reading.

Figure 5A:
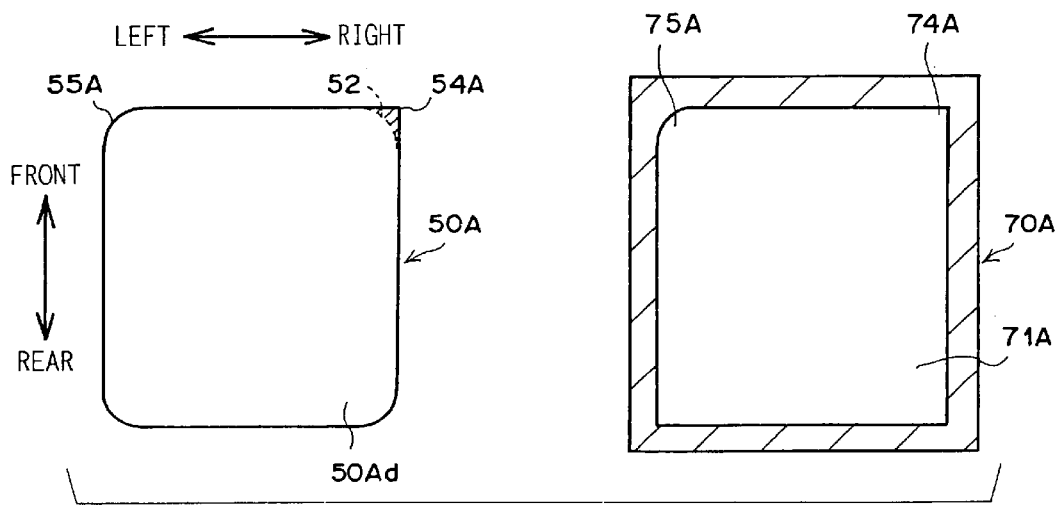
FIGS. 5A and 5B are diagrams showing another embodiment of combinations of stimulable phosphor sheets and cassettes of the present invention.
Figure 5B:
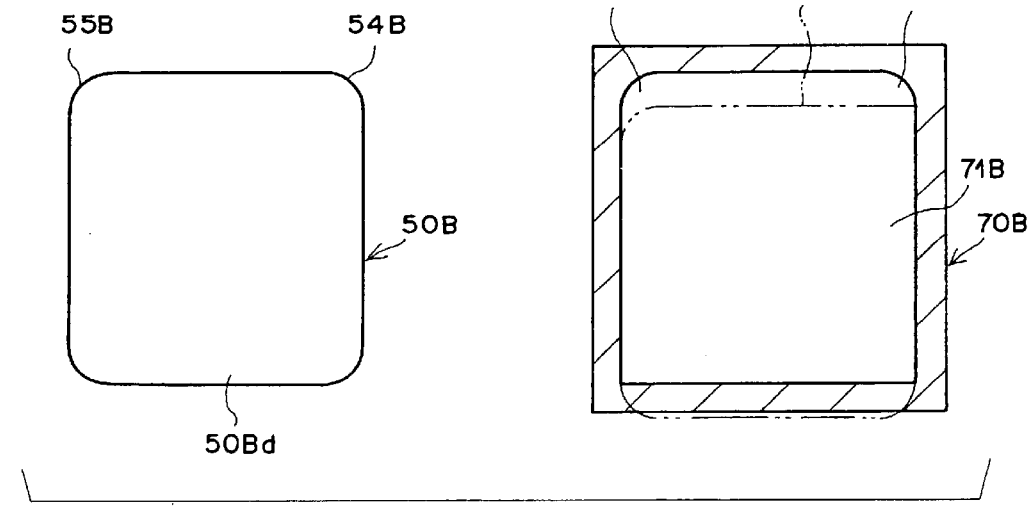
Figure 6A:
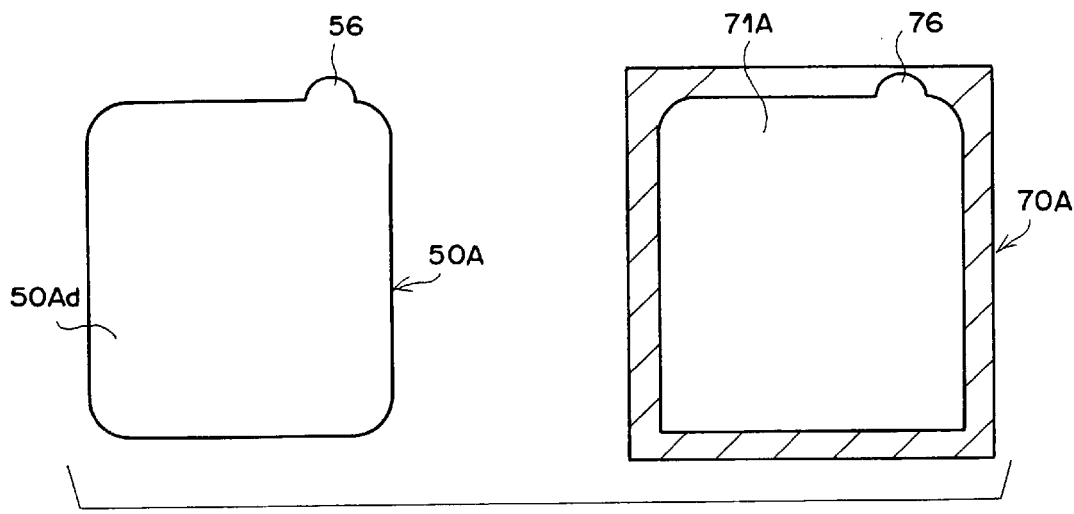
FIGS. 6A and 6B are diagrams showing another embodiment of combinations of stimulable phosphor sheets and cassettes of the present invention.
Figure 6B:
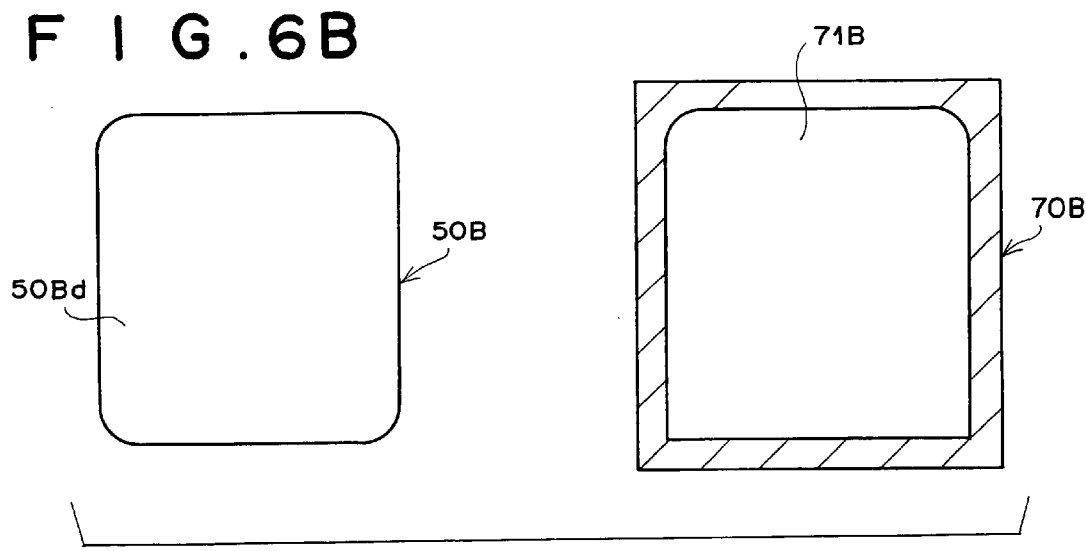

FIGS. 5 to 7 show embodiments of a stimulable phosphor sheet 50A for single-side reading having an additional plane part not existing in a stimulable phosphor sheet 50B for double-side reading in a corresponding position. In combinations shown in FIGS. 5 to 7, sheets are shown in a frontal view while cassettes are shown in a cross-sectional view cut by a line corresponding to the line I—I in FIG. 2A.

In an embodiment shown in FIG. 5, a sheet 50A for single-side reading has three round corners, but an upper-right corner 54A of the sheet forms a right angle. Meanwhile, a sheet 50B for double-side reading has four round corners including an upper-right corner 54B. If the sheet 50A is overlaid with the sheet 50B, a portion 52 (shown by hatched lines in FIG. 5A) of the right-angle corner 54A of the sheet 50A extends beyond the round corner 54B of sheet 50B. The portion 52 serves as an additional plane part.

An upper-right corner 74A and an upper-left corner 75A of a container area 71A of a cassette 70A for single-side reading respectively have a right-angle shape and a round shape in accordance with the shape of the upper-right corner 54A and a shape of an upper-left corner 55A of the sheet 50A. Meanwhile, an upper-right corner 74B and an upper-left corner 75B of a container area 71B of a cassette 70B for double-side reading are round in accordance with the shapes of the upper-right corner 54B and an upper-left corner 55B of the sheet 50B.

Since the cassette 70B for double-side reading has the round corner 74B in the container area 71B thereof, the right-angle corner 54A of the sheet 50A prevents the sheet 50A from being inserted in the cassette 70B, as shown by dashed lines in FIG. 5B. As a result, the sheet 50A cannot be stored in the cassette 70B.

In an embodiment shown in FIG. 6, a circular projection 56 is formed in a portion of a front edge of a stimulable phosphor sheet 50A for single-side reading. A stimulable phosphor sheet 50B for double-side reading does not have such a projection in a corresponding position, and the projection 56 serves as an additional plane part in this embodiment.

A cassette 70A for single-side reading has a notch 76 in a container area 71A thereof, in accordance with the projection 56 of the sheet 50A. Meanwhile, a cassette 70B for double-side reading does not have such a notch and has a shape that matches with a shape of the sheet 50B.

Therefore, if the sheet 50A for single-side reading is inserted in the cassette 70B for double-side reading, the projection 56 prevents the sheet from being contained in the cassette, and the cassette cannot store the sheet 50A.

In an embodiment shown in FIG. 7, a circular notch 57B is formed in a portion of a front edge of a stimulable phosphor sheet 50B for double-side reading, while a stimulable phosphor sheet 50A for single-side reading does not have such a notch in a corresponding position at a front edge thereof. In this embodiment, a portion 57A of the sheet 50A corresponding to the notch 57B of the sheet 50B for double-side reading serves as an additional plane part.

A cassette 70A for single-side reading has a shape matching with the sheet 50A for single-side reading. A container area 71B of a cassette 70B for double-side reading has a projection 77 matching with the notch 57B of the sheet 70B, as shown in FIG. 7B. Therefore, the sheet 50A is prevented from being contained in the cassette 70B, due to the projection 77 in the container area 71B. As a result, the sheet 50A for single-side reading cannot be contained in the cassette 70B for double-side reading.

In the embodiments shown in FIGS. 5 to 7, the additional plane parts not existing in the corresponding positions in the sheets 50B for double-side reading are respectively formed in the sheets 50A for single-side reading. Each of the sheets 50A therefore cannot be stored in the cassette 70B for double-side reading in each of the embodiments, due to the additional part. In this manner, insertion of the sheet 50A for single-side reading in the cassette 70B for double-side reading can be prevented. In the above embodiments, each of the additional plane parts is formed in one portion of the sheet. However, the additional part may be formed in a plurality of portions of the sheet, and various shapes can be used in various positions. Furthermore, the sheet 50A for single-side reading may be slightly larger than the sheet 50B for double-side reading. In this case, the cassette for single-side reading and the cassette for double-side reading respectively have the container areas in accordance with the sizes of the corresponding sheets. In this manner, the sheet 50A for single-side reading cannot be stored in the cassette 70B for double-side reading, since the container area 71B of the cassette 70B is smaller than the sheet 50A for single-side reading.

Figure 8A:
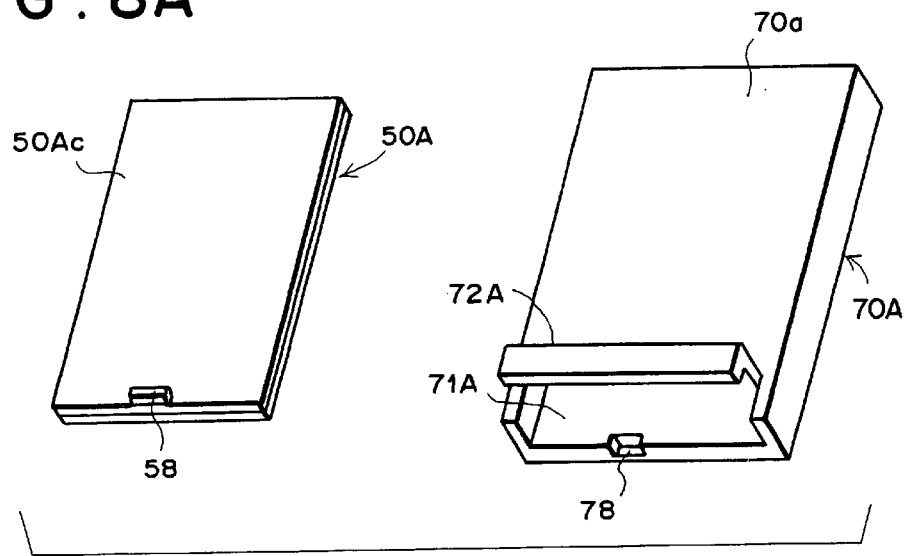
FIGS. 8A and 8B are diagrams showing another embodiment of combinations of stimulable phosphor sheets and cassettes of the present invention.
Figure 8B:
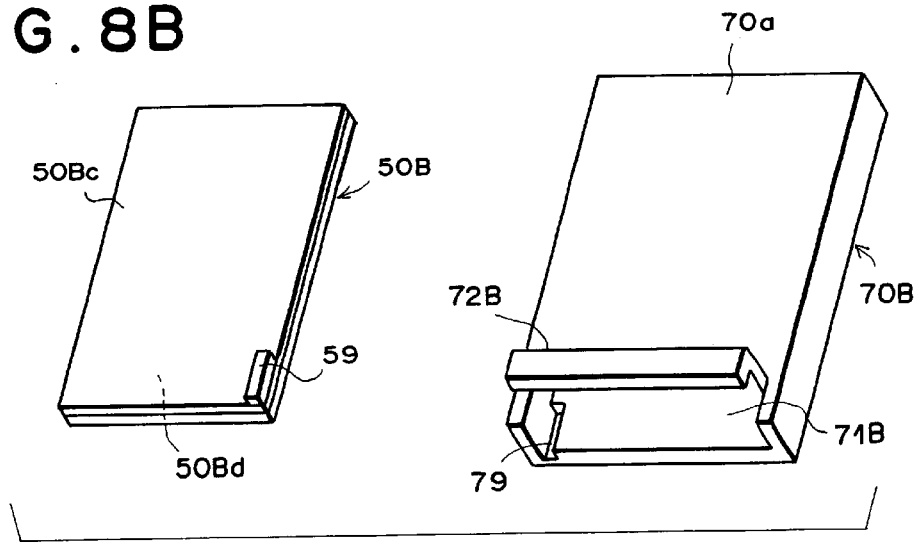

Other embodiments will be explained with reference to FIGS. 8 to 10. In each of the embodiments, a stimulable phosphor sheet 50A for single-side reading cannot be stored in a cassette 70B for double-side reading while a stimulable phosphor sheet 50B for double-side reading cannot be stored in a cassette 70A for single-side reading. FIG. 8 shows an embodiment in which sheets 50A and 50B respectively have thick additional parts existing in positions not corresponding to each other.

In combinations shown in FIG. 8, the sheets and cassettes are shown in perspective views. For the sake of simpler explanation, the sheets are viewed from the back. The sheet 50A for single-side reading has a convex additional part 58 in a center portion of a rear edge on a backside 50Ac thereof, and the additional part does not exist in a corresponding position 50Bc of the sheet 50B for double-side reading. In other words, the sheet 50A is thicker in this portion than the sheet 50B, due to the additional part 58. Meanwhile, the sheet 50B for double-side reading has an additional part 59 in a portion of a side edge on a backside 50Bc thereof, and the additional part 59 does not exist in a corresponding position on the backside 50Ac of the sheet 50A for single-side reading. In other words, the sheet 50B is thicker in this portion than the sheet 50A, due to the additional part 59.

A cassette 70A to contain the sheet 50A described above has a groove 78 matching with the additional part 58 of the sheet 50A in a container area 71A thereof, on a rear edge of a bottom surface viewed from a front side 70a of the cassette. Meanwhile, a cassette 70B for double-side reading to contain the sheet 50B described above has a groove 79 matching with the additional part 59 of the sheet 50B, in a container area 71B thereof, at a rear edge of a bottom surface viewed from a front side 70a of the cassette.

Therefore, the cassette 70B cannot contain the sheet 50A for single-side reading in the container area 71B due to the additional part 58, while the cassette 70A cannot contain the sheet 50B for double-side reading in the container area 71A due to the additional part 59. In this manner, combinations of the sheets and the cassettes are not mistaken. In this embodiment, each of the convex additional parts is formed on one sheet edge. However, various shapes can be adopted in various positions.

Figure 9A:
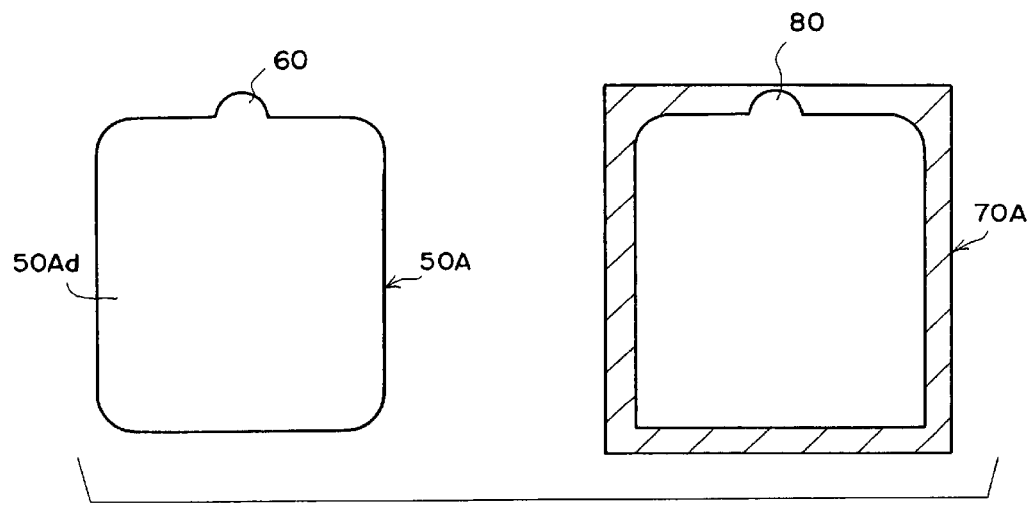
FIGS. 9A and 9B are diagrams showing another embodiment of combinations of stimulable phosphor sheets and cassettes of the present invention.
Figure 9B:
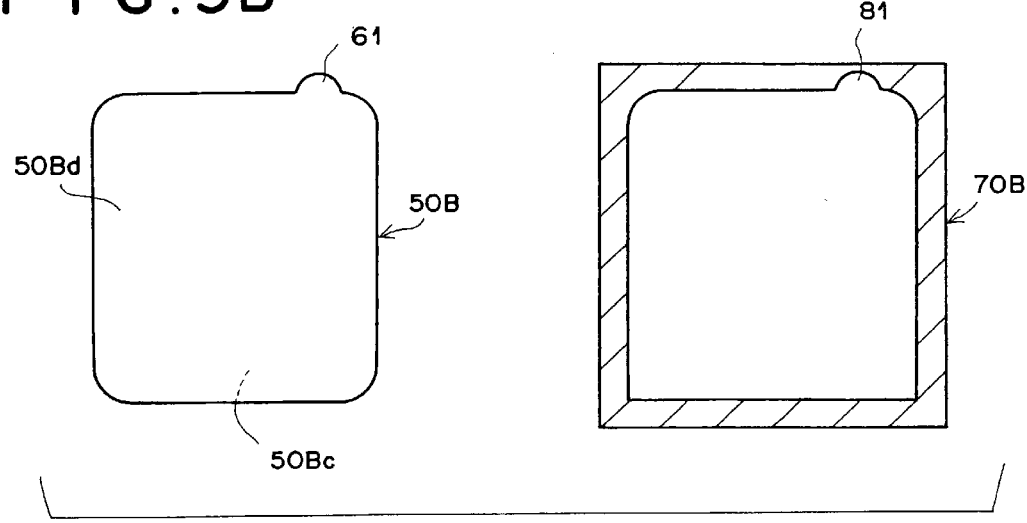
Figure 10A:
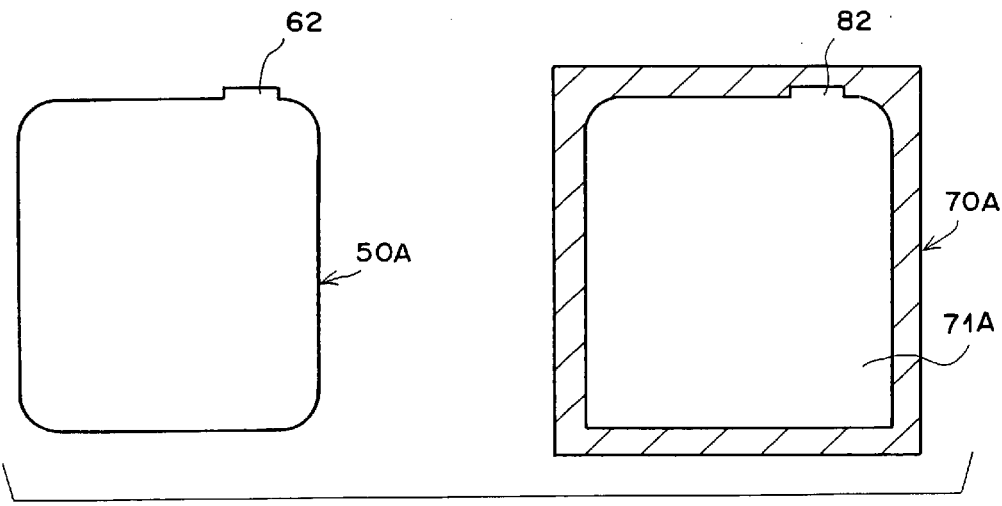
FIGS. 10A and 10B are diagrams showing an other embodiment of combinations of stimulable phosphor sheets and cassettes of the present invention.
Figure 10B:
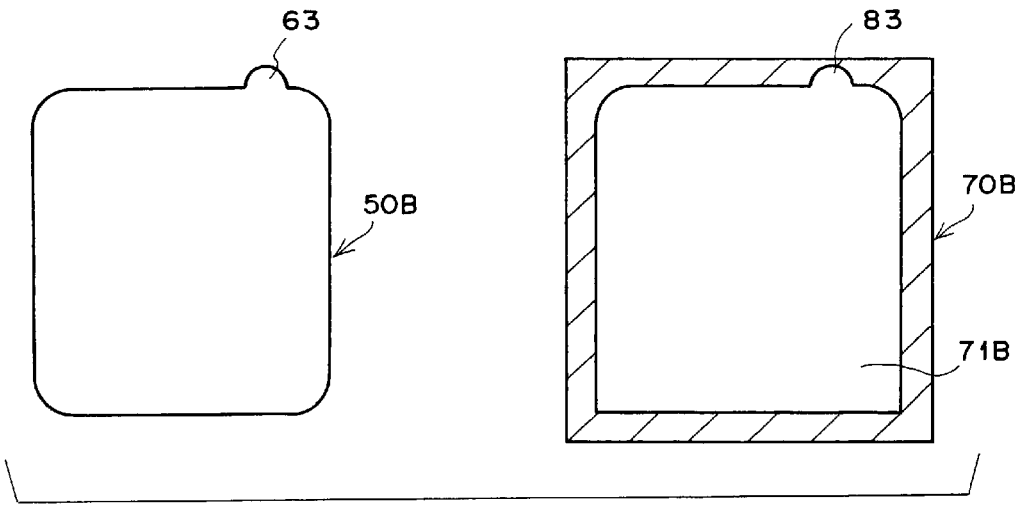

In each of combinations shown in FIGS. 9 and 10, each of the sheets is shown by a frontal view and each of cassettes is shown in a cross-sectional view cut by a line corresponding to the line I—I in FIG. 2A. In FIGS. 9 and 10, each of the sheets 50A for single-side reading has an additional plane part not existing in each of the sheets 50B for double-side reading in a corresponding position, while each of the sheets 50B for double-side reading has an additional plane part not existing in each of the sheets 50A for single-side reading in a corresponding position. In this manner, each of the sheets cannot be stored in the cassette of a different combination.

In an embodiment shown in FIG. 9, a circular projection 60 is formed in a center portion of a front edge of a sheet 50A for single-side reading, while a circular projection 61 is formed in a right portion of a front edge of a sheet 50B for double-side reading. Each of the projections 60 and 61 serves as an additional plane part not existing in a corresponding position of the other sheet.

As shown in FIG. 9, a cassette 70A for single-side reading has a notch 80 in a center portion of a front edge in accordance with the projection 60 of the sheet 50A for single-side reading. Meanwhile, a cassette 70B for double-side reading has a notch 81 in a right portion of a front edge in accordance with the projection 61 of the sheet 50B for double-side reading. Therefore, the sheet 50A cannot be stored in a container area 71B of the cassette 70B due to the projection 60, while the sheet 50B cannot be stored in the cassette 70A due to the projection 61. In this manner, the combinations of the sheets and the cassettes are not mistaken.

In this embodiment, each of the sheets 50A and 50B has the projection and the projection prevents the sheet from being stored mistakenly in the cassette of the other combination. However, each of the sheets only has to have a part serving as an additional part. Therefore, not only the projections but also a notch or a hole only in one of the sheets may be used. In this case, a portion of the other sheet corresponding to the notch or the hole of the sheet serves as the additional plane part. Various forms can be used as the additional part in various positions.

In an embodiment shown in FIG. 10, a projection 62 having a rectangular shape is formed on the right of a front edge of a sheet 50A for single-side reading. A sheet 50B for double-side reading has a round projection 63 in a corresponding position (on the right of a front edge) thereof. The projections 62 and 63 are respectively formed at the same positions on the sheets 50A and 50B. However, when the sheet 50A is overlaid with the sheet 50B, two corners of the rectangular projection 62 of the sheet 50A extend beyond the sheet 50B, which serves as an additional plane part. Meanwhile, the tip of the round projection 63 of the sheet 50B extends beyond the sheet 50A, which serves as a additional plane part.

A container area 71A of a cassette 70A for single-side reading has a rectangular notch 82 at a front edge thereof, in accordance with the rectangular notch 62 of the sheet 50A.

A container area 71B of a cassette 70B for double-side reading has a round notch 83 at a front edge thereof, in accordance with the round notch of the sheet 50B. Therefore, the cassette 70B cannot contain the sheet 50A due to the additional part of the rectangular projection 62, while the cassette 70A cannot contain the sheet 50B due to the additional part of the round projection 63 of the sheet 50B. In this manner, the combinations of the sheets and the cassettes are not mistaken.

The combinations of the sheets 50B and the cassettes 70B shown in FIGS. 7, 8, and 9 are embodiments wherein each of the sheets 50B has different shapes when viewed from the front side and from the backside thereof and thus cannot be contained in the container area 71B of the corresponding cassette 70B in a state other than the state described above, due to the shapes different between the front side and the backside.

More specifically, the sheet 50B in FIG. 7 has the notch 57B on the right at the front edge thereof when viewed from the front side 50Bd. However, when viewed from the backside 50Bc, the notch 57B exists on the left. As a result, the sheet 50B has the shapes different between the front side and the backside. Therefore, the sheet 50B cannot be stored in the cassette 70B in a face down state, due to the disagreement in positions between the notch 57B and the projection 77 of the cassette 70B. In this manner, the sheet 50B is prevented from being stored face down in the cassette 70B.

In FIG. 8, the sheet 50B has the convex additional part 59 on the right at the rear edge thereof, when viewed from the backside 50Bc thereof. However, when viewed from the front side 50Bd, the additional part 59 does not exist. As a result, the sheet 50B has shapes different between the front side and the backside thereof. Therefore, when the sheet 50B is inserted face down in the cassette 70B, the additional part 59 on the rear right does not allow the sheet to be inserted in the container area 71B of the cassette 70B. In this manner, storage of the sheet 50B in a face down state is prevented.

In FIG. 9, the sheet 50B has the projection 61 on the front right edge when viewed from the front side 50Bd thereof. However, the sheet has the projection 61 on the front left edge when viewed from the backside 50Bc thereof. As a result, the sheet 50B has different shapes when viewed from the front side and from the backside. Therefore, when the sheet 50B is inserted in the cassette 70B face down, positions of the projection 61 and the notch 81 of the cassette 70B do not agree, and the sheet is prevented from being stored in the cassette 70B. In this manner, the sheet 50B can be prevented from being stored in the cassette 70B face down.

The sheets 50B shown in FIGS. 7 to 9 are examples of sheets having shapes different between the front side and the backside. By having a unique shape or shapes such as projections, notches, convexities, grooves, and holes of various shapes and sizes in a portion or a plurality of portions in one sheet, the sheet has different shapes when viewed from the front side and the backside thereof. If a cassette for double-side reading has a container area having a shape in accordance with the unique shape or shapes of the sheet as in the above embodiments, the sheet can be prevented from being stored in the cassette face down.

Embodiments of combinations using colored parts will be explained with reference to FIGS. 11 and 12. In one embodiment, either a combination of a sheet and a cassette for single side reading or a sheet and a cassette for double-side reading has the colored parts, while both combinations in another embodiment have the colored parts different from each other in positions, shapes and colors.

Figure 11A:
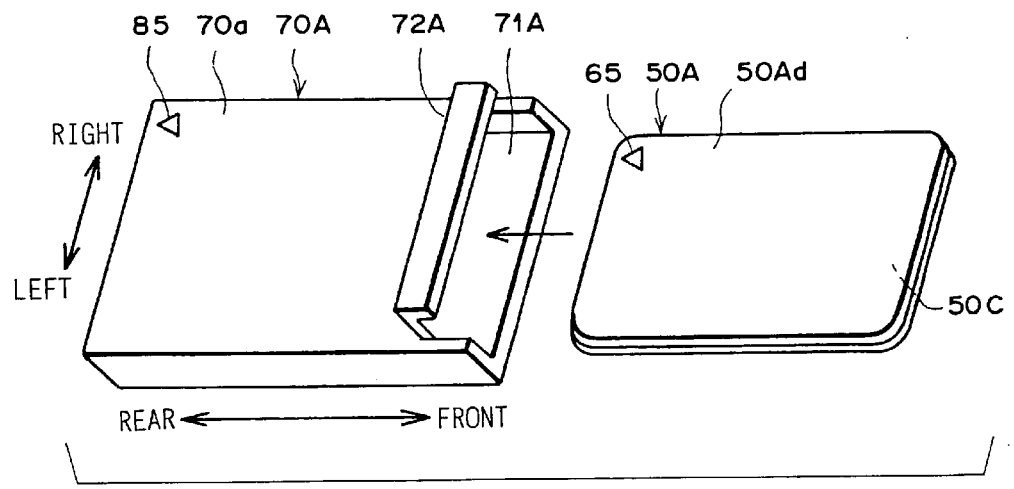
FIGS. 11A and 11B are diagrams showing an other embodiment of combinations of stimulable phosphor sheets and cassettes of the present invention.
Figure 11B:
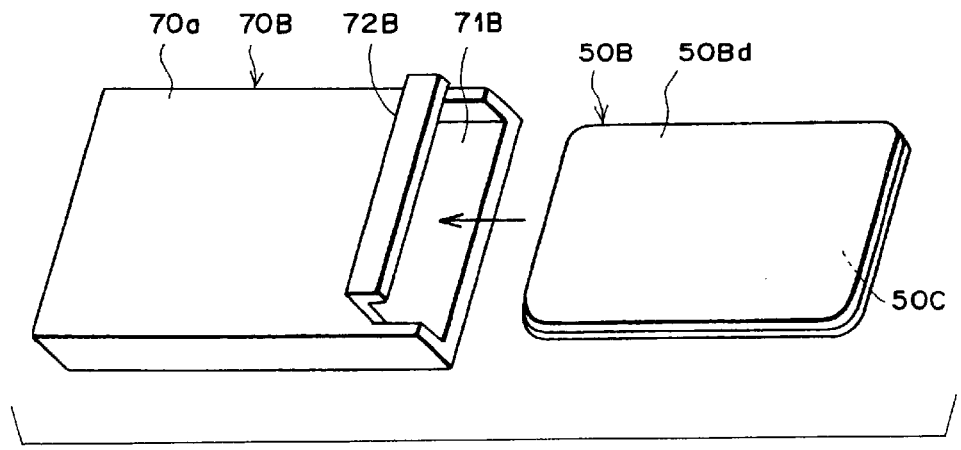

FIG. 11 shows a perspective view of an embodiment in which only a combination of a sheet 50A and a cassette 70A for single-side reading has colored parts. As shown in FIG. 11A, the sheet 50A for single-side reading has a triangular colored part 65 on a front side 50Ad thereof. The part 65 is colored with a predetermined color. The cassette 70A for single-side reading has a triangular colored part 85 at a corner on a front side 70a thereof. The part is also colored with the same color as the sheet 50A. In this embodiment, as shown in FIG. 11B, a sheet 50B and a cassette 70B for double-side reading do not have such a colored part.

If the colored parts are only formed in either combination of the sheet and the cassette, the sheet having the colored part is properly contained in the cassette having the colored part while the sheet not having the colored part is properly contained in the cassette not having the colored part. In this manner, the sheet for single-side reading is prevented from being stored in the cassette for double-side reading and vice versa.

Figure 12A:
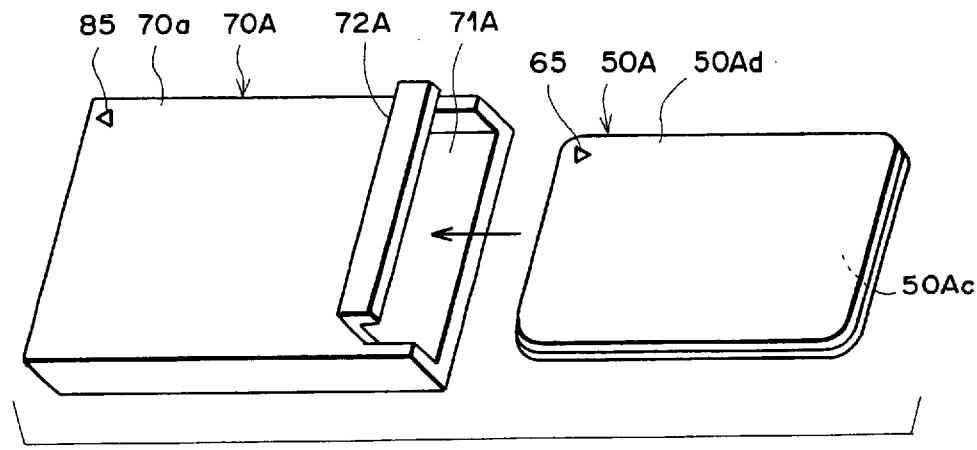
FIGS. 12A and 12B are diagrams showing another embodiment of combinations of stimulable phosphor sheets and cassettes of the present invention.
Figure 12B:
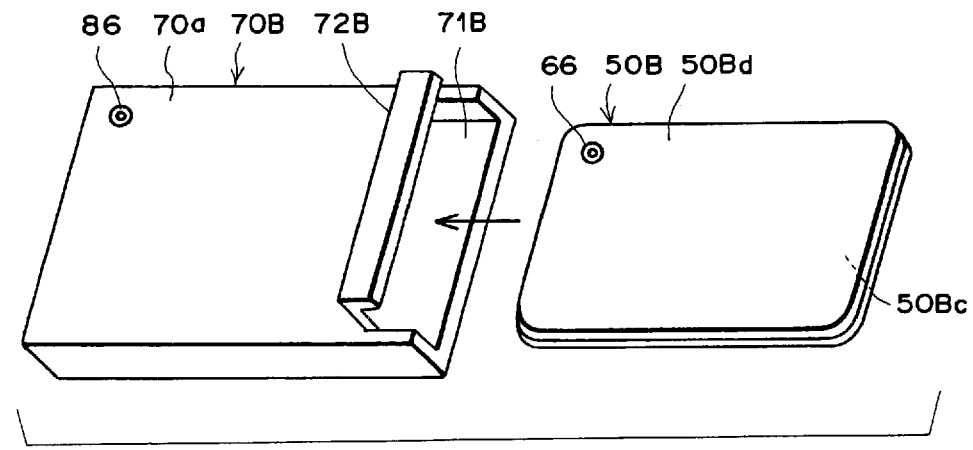

FIG. 12 shows a perspective view of combinations of a sheet 50A and a cassette 70A for single-side reading and a sheet 50B and a cassette 70B for double-side reading, each having different colored parts in different shapes, colors or in different positions. FIG. 12A shows the same combination as in FIG. 11A. The sheet 50A has the triangular colored part 65 colored with the predetermined color on the front side 50Ad thereof, while the cassette 70A for single-side reading has the triangular colored part 85 colored with the same color as the part 65 in the corner on the front side 70a thereof. In this embodiment, the sheet SOB and the cassette 70B for double-side reading have colored parts, as shown in FIG. 12B. When both the combinations have the colored parts, the colored parts in each combination need to be different from the colored parts in the other combination in terms of positions, shapes or colors. In FIG. 12, the sheet 50B and the cassette 70B for double-side reading have double-circle colored parts 66 and 86.

If the colored parts different in each combination are formed, the sheet having the triangular colored part is stored in the cassette having the triangular colored part while the sheet having the double-circle colored part is stored in the cassette having the double-circle colored part. In this manner, the sheets can be respectively contained in the proper cassettes. Therefore, each of the sheets is prevented from being stored in the cassette of the other combination.

In the combination of the sheet and the cassette for double-side reading, the colored part is formed only on either side of the sheet 50B. By forming the colored part of the cassette on a material facing the side of the sheet on which the colored part is formed, the sheet can be properly stored in the cassette without judging which side is the front side or the backside, if the colored parts are matched up. For example, as shown in FIG. 12B, the sheet 50B has the double-circle colored part in an upper right corner on the front side 50Ad thereof, and the cassette 70B has the double-circle colored part in an upper-right corner on the front side 70a thereof. The material facing the sheet on the front side refers to a material on the front side 70a of the cassette while a material facing the sheet on the backside refers to a material at the bottom of the cassette when the cassette is viewed from the front side 70a thereof.

Figure 13A:
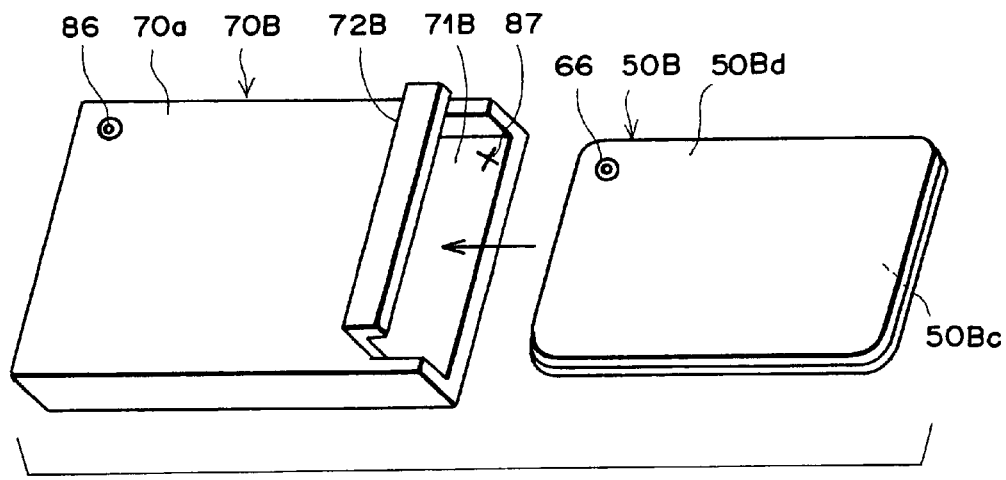
FIGS. 13A and 13B are diagrams showing an embodiment of colored parts formed on a double-side reading stimulable phosphor sheet and a cassette therefor.
Figure 13B:
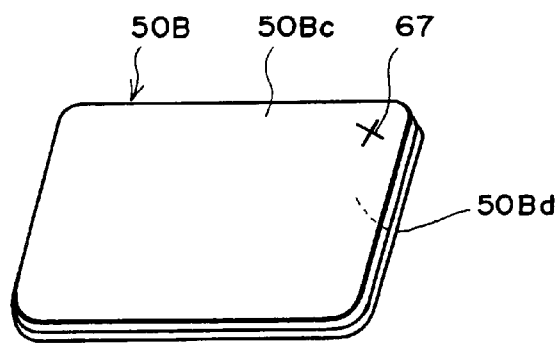

In the combination of the sheet and the cassette for double-side reading, the colored part may be formed on both sides of the sheet 50B. However, in this case, the colored parts need to be different in colors, shapes or positions. FIG. 13A shows a perspective view of a combination of a sheet 50B and a cassette 70B for double-side reading, while FIG. 13B shows the sheet in FIG. 13A viewed from a backside thereof. In this embodiment, the sheet SOB has a double-circle colored part in an upper-fight corner on a front side 50Bd thereof, while an X-mark colored part is formed in a rear right corner on a backside 50Bc thereof. A double-circle colored part 86 is formed in an upper right corner of a front side 70a of a cassette 70B facing the front side 50Bd of the sheet 50B, while an X-mark colored part is formed in a rear right corner of a bottom surface of a container area 71B facing the backside 50Bc of the sheet 50B. By inserting the sheet 50B in the cassette 70B to match up the colored parts, the sheet SOB can be properly stored in the cassette 70B without judging which side i the front side or the backside.

In the embodiments shown in FIGS. 11 to 13, the positions of the colored parts formed on the sheets are not specifically limited. However, the colored parts are preferably formed near an edge or edges of each of the sheets. Furthermore, it is preferable for the colored parts 65 and 66 to be colored with a predetermined color different from a color of the stimulable phosphor. The colored parts may simply be colored or have a shape of a figure or a character, for example. Moreover, the colored parts may be formed by putting a sticker or the like on the sheets.

The colored parts on the front side of the sheets are colored with a color not absorbing excitation light irradiated on the sheets and light from the sheets emitted by a scan with the excitation light. The colored part formed on the backside 50c is colored with a color not absorbing the light emitted from the sheet by the scan with excitation light. More specifically, the front side can be colored with a dye absorbing only light having a wavelength of 500~600 nm, while the backside can be colored with a color not absorbing light having a wavelength of 350~450 nm in the case where the stimulable phosphor is BFX: Eu. The backside can be colored in blue.

By coloring the parts 65 and 66 in the above manner, the light and the excitation light are not absorbed by the colored part 65 on the front side while the light is not absorbed by the colored part 66 on the backside. In this manner, reading performance is not deteriorated due to a loss caused by absorption of the excitation light or the light.

What is claimed is:

1. Combinations of stimulable phosphor sheets and cassettes comprising a combination of a double-side reading stimulable phosphor sheet enabling reading from both sides of the sheet and a cassette for double-side reading having a container area for containing the double-side reading stimulable phosphor sheet and a combination of a single-side reading stimulable phosphor sheet enabling reading only from one side of the sheet and a cassette for single-side reading having a container area for containing the single-side reading stimulable phosphor sheet, wherein the double-side reading stimulable phosphor sheet has a shape different from a shape of the single-side reading stimulable phosphor sheet and a shape of the container area of the cassette for double-side reading prevents the single-side reading stimulable phosphor sheet from being contained in the cassette due to a difference in the shapes of the sheets.

2. Combinations of stimulable phosphor sheets and cassettes as defined in claim 1, wherein the single-side reading stimulable phosphor sheet has an additional part not existing in a corresponding position in the double-side reading stimulable phosphor sheet, and the shape of the container area of the cassette for double-side reading prevents the single-side reading stimulable phosphor sheet from being contained in the cassette due to the additional part of the single-side reading stimulable phosphor sheet.

3. Combinations of stimulable phosphor sheets and cassettes comprising a combination of a double-side reading stimulable phosphor sheet enabling reading from both sides of the sheet and a cassette for double-side reading having a container area for containing the double-side reading stimulable phosphor sheet and a combination of a single-side reading stimulable phosphor sheet enabling reading only from one side of the sheet and a cassette for single-side reading having a container area for containing the single-side reading stimulable phosphor sheet, wherein the double-side reading stimulable phosphor sheet has a shape different from a shape of the single-side reading stimulable phosphor sheet, a shape of the container area of the cassette for double-side reading prevents the single-side reading stimulable phosphor sheet from being contained in the cassette due to a difference in the shapes of the sheets, and a shape of the container area of the cassette for single-side reading prevents the double-side reading stimulable phosphor sheet from being contained in the cassette due to the difference in the shapes of the sheets.

4. Combinations of stimulable phosphor sheets and cassettes as defined in claim 3, wherein the single-side reading stimulable phosphor sheet is formed to have an additional part not existing in a corresponding position in the double-side reading stimulable phosphor sheet, the shape of the container area of the cassette for double-side reading prevents the single-side reading stimulable phosphor sheet from being contained in the cassette due to the additional part of the single-side reading stimulable phosphor sheet, the double-side reading stimulable phosphor sheet has an additional part not existing in a corresponding position in the single-side reading stimulable phosphor sheet, and the shape of the container area of the cassette for single-side reading prevents the double-side reading stimulable phosphor sheet from being contained in the cassette due to the additional part of the double-side reading stimulable phosphor sheet.

5. Combinations of stimulable phosphor sheets and cassettes as defined in claim 2 or 4, wherein the additional part is a thick additional part having more thickness.

6. Combinations of stimulable phosphor sheets and cassettes as defined in claim 2 or 4, wherein the additional part is an additional plane part having a wider area.

7. Combinations of stimulable phosphor sheets and cassettes as defined in any one of claims 1 to 4, wherein the double-side reading stimulable phosphor sheet has different shapes when viewed from a front side and from a backside thereof and the shape of the container area of the cassette for double-side reading prevents the double-side reading stimulable phosphor sheet from being contained in the cassette in a face down state, due to a difference in the shapes of the double-side reading stimulable phosphor sheet viewed from the front side and from the backside thereof.

8. Combinations of stimulable phosphor sheets and cassettes as defined in claim 5, wherein the double-side reading stimulable phosphor sheet has different shapes when viewed from a front side and from a backside thereof and the shape of the container area of the cassette for double-side reading prevents the double-side reading stimulable phosphor sheet from being contained in the cassette in a face down state, due to a difference in the shapes of the double-side reading stimulable phosphor sheet viewed from the front side and from the backside thereof.

9. Combinations of stimulable phosphor sheets and cassettes comprising a combination of a double-side reading stimulable phosphor sheet enabling reading from both sides of the sheet and a cassette for double-side reading having a container area for containing the double-side reading stimulable phosphor sheet and a combination of a single-side reading stimulable phosphor sheet enabling reading only from one side of the sheet and a cassette for single-side reading having a container area for containing the single-side reading stimulable phosphor sheet, wherein either the double-side reading stimulable phosphor sheet or the single-side reading stimulable phosphor sheet has a colored part and only the cassette for the sheet having the colored part has a colored part corresponding to the colored part of the sheet.

10. Combinations of stimulable phosphor sheets and cassettes comprising a combination of a double-side reading stimulable phosphor sheet enabling reading from both sides of the sheet and a cassette for double-side reading having a container area for containing the double-side reading stimulable phosphor sheet and a combination of a single-side reading stimulable phosphor sheet enabling reading only from one side of the sheet and a cassette for single-side reading having a container area for containing the single-side reading stimulable phosphor sheet, wherein both the double-side reading stimulable phosphor sheet and the single-side reading stimulable phosphor sheet have respective colored parts having different shapes or colors or in different positions and the cassettes for containing the respective sheets have respective colored parts corresponding to the colored parts of the corresponding sheets.

11. Combinations of stimulable phosphor sheets and cassettes as defined in claim 8, wherein the colored part in the double-side reading stimulable phosphor sheet is formed only on either a front side or a backside thereof and the colored part in the cassette for double-side reading is formed on a material facing the side of the double-side reading sheet on which the colored part is formed.

12. Combinations of stimulable phosphor sheets and cassettes as defined in claim 8, wherein the colored parts of the double-side reading stimulable phosphor sheet are formed on both sides of the sheet in different shapes or colors or in different positions and the colored parts of the cassette for double-side reading are formed on materials facing both the sides of the double-side reading stimulable phosphor sheet, corresponding to the colored parts on both the sides of the double-side reading sheet.

13. Combinations of stimulable phosphor sheets and cassettes as defined in claim 6, wherein the double-side reading stimulable phosphor sheet has different shapes when viewed from a front side and from a backside thereof and the shape of the container area of the cassette for double-side reading prevents the double-side reading stimulable phosphor sheet from being contained in the cassette in a face down state, due to a difference in the shapes of the double-side reading stimulable phosphor sheet viewed from the front side and from the backside thereof.

14. Combinations of stimulable phosphor sheets and cassettes as defined in claim 9, wherein the colored part in the double-side reading stimulable phosphor sheet is formed only on either a front side or a backside thereof and the colored part in the cassette for double-side reading is formed on a material facing the side of the double-side reading sheet on which the colored part is formed.

15. Combinations of stimulable phosphor sheets and cassettes as defined in claim 9, wherein the colored parts of the double-side reading stimulable phosphor sheet are formed on both sides of the sheet in different shapes or colors or in different positions and the colored parts of the cassette for double-side reading are formed on materials facing both the sides of the double-side reading stimulable phosphor sheet, corresponding to the colored parts on both the sides of the double-side reading sheet.

\* \* \* \* \*